REAGENT GENERATOR
Filed Oct. 4, 1968
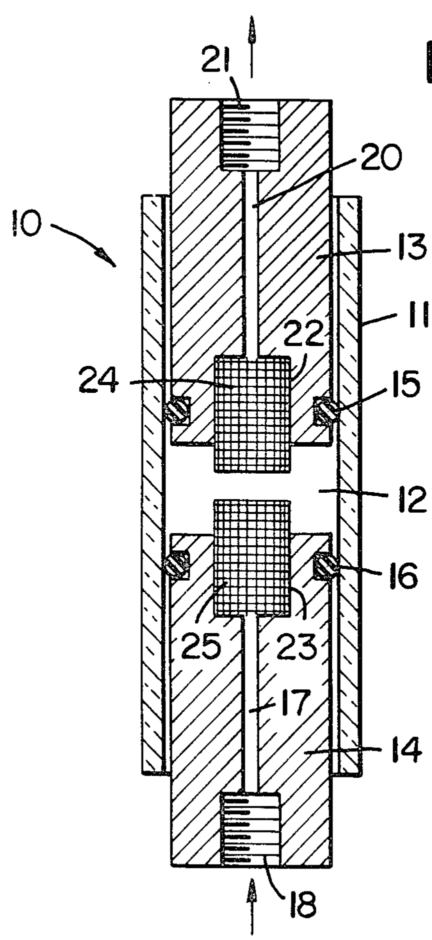
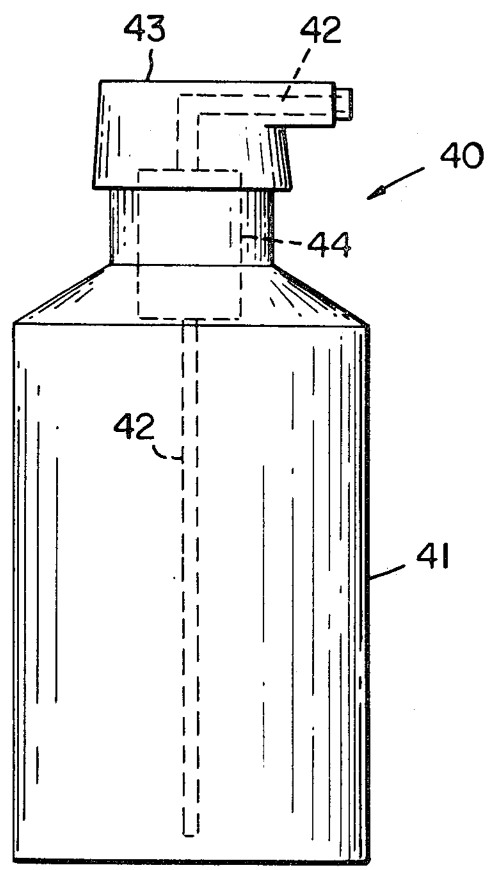
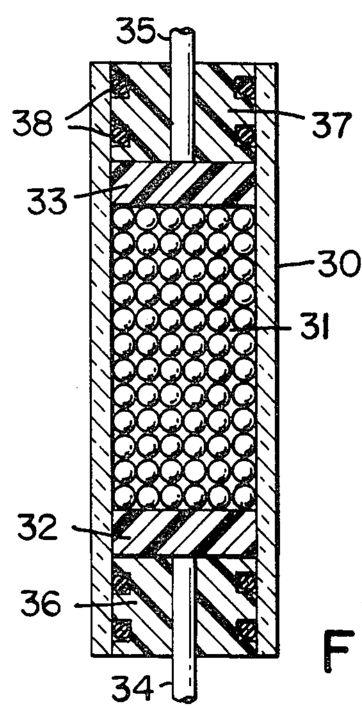
INVENTOR.
JAMES A. PATTERSON
RAYMOND C. McMURRAY
CAROL J. SCHWARZOTT
Townsend and Townsend
ATTORNEYS United States Patent Office 3,632,496

Patented Jan. 4, 1972

1

3,632,496

REAGENT GENERATOR

James A. Patterson, Los Altos, Raymond C. McMurray, Menlo Park, and Carol J. Schwarzott, San Jose, Calif., assignors to Sondell Research & Development Co., Palo Alto, Calif.

Filed Oct. 4, 1968, Ser. No. 765,226
Int. Cl. B01k 3/04; C22d 1/02
U.S. Cl. 204—249 10 Claims

ABSTRACT OF THE DISCLOSURE

A reagent reactor is disclosed formed from an elongated housing having a channel therethrough including an inlet at one end for receiving a reagent and an outlet at the other end for discharging activated reagent. The channel is defined by surfaces of metallic material catalytically active for reducing ninhydrin to form activated reagent.

This invention relates to a new and improved reagent reactor for activating ninhydrin and similar reagents for reaction with amino acids and other biological molecules for colorimetric identification and quantitation.

A classical method of identification and quantitation of amino acids is by reaction of the amino acids with ninhydrin reagent to produce a purple compound. The color developed by the reaction provides a means of photometric or colorimetric identification and quantitation. Ninhydrin, however, is a stable compound which alone will not sufficiently develop the colored reaction with amino acids. The ninhydrin must be mixed in certain proportions under controlled conditions with a reduced form of the reagent known as hydrindantin. Hydrindantin is an unstable compound which alone will not sufficiently develop the color reaction with amino acids either. Thus, the ninhydrin and hydrindantin must be mixed in a solvent system to maintain a predetermined concentration ratio of ninhydrin to hydrindantin to amino acids in the order of, for example, 250 to 25 to 1. High buffer capacity salts are also required to maintain a controlled pH.

Because of the instability of hydrindantin, that compound and mixtures including that compound must be stored at a reduced temperature in a black bottle and even then cannot be stored in excess of two weeks without the hydrindantin breaking down. Normally, the hydrindantin is formed by adding tin to ninhydrin reagent which reduces the ninhydrin to form hydrindantin according to the following equation:

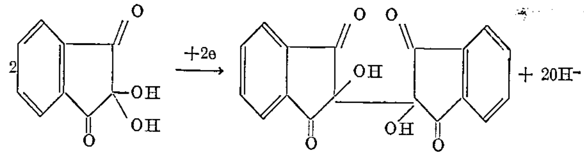

The ninhydrin-tin mixture is subject to the same short effective life, however. For suitable development of the colored compound for identification and quantitation of amino acids a molecular concentration ratio of ninhydrin to hydrindantin to amino acids of approximately at least 250 to 25 to 1 is required. These ratios represent the minimum concentration of ninhydrin and hydrindantin to sufficiently produce the colored compound by reaction with the amino acids. Such a ninhydrin-tin mixture prepared in a suitable solvent system as is known in the art is unstable and its reactivity with amino acids to produce the characteristic colored compound for identification and quantitation degenerates quickly.

It is an object of the present invention to provide a new and improved method and apparatus for continuously generating and activating ninhydrin reagent for identification and quantitation of amino acids and other biological molecules. Thus, according to the invention ninhydrin in its stable state may be stored indefinitely and activated only as required for reaction with amino acids and other molecules.

A feature and advantage of the invention is that ninhydrin activated according to the present invention produces a 20% increase in sensitivity in colorimetric identification and quantitation of certain amino acids such as glycine, cystine, methionine and leucine. Furthermore, in identifying all amino acids and other molecules, one-fifth the concentration of ninhydrin previously used generates the same color for analysis when activated according to the present invention.

Another object of the invention is to provide a reagent generator for activating ninhydrin without the necessity of preparing a complex solvent system for maintaining tin metal in solution in ninhydrin.

A further object of the invention is to provide a reagent sprayer capable of storing ninhydrin in its stable form and spraying reagent while simultaneously activating the reagent for use in identifying and quantitating samples eluted on chromatographic paper.

In order to accomplish these results, the present invention contemplates providing a reagent reactor comprising an elongated housing having a channel therethrough including an inlet at one end for receiving a reagent and an outlet at the other end for discharging activated reagent. The channel is formed by a multitude of tortuous passageways defined by surfaces of metallic material catalytically active for activating a reagent percolating through the passageways.

According to one aspect of the invention the channel is packed with a plurality of beads of a resin material, each resin bead having a concentric layer formed thereon from a metal material catalytically active in reducing ninhydrin. In a preferred embodiment of this aspect of the invention, spherical resin beads are formed of a cross-linked copolymer resin having an ionic or conductive outer layer produced by, for example, a controlled depth sulfonation reaction. A copper layer is then bonded to the ionic surface of the resin bead by electrolytic deposition and a nickel layer is deposited concentrically about the resin bead on the copper providing a metal-to-metal bond.

According to another aspect of the invention electrodes are provided for passing a current through the reagent passing through the channel. For example, rolled screening of different metal materials is packed at opposite ends of the channel and connected respectively to electrodes at each end for applying a voltage through the channel and thereby pass a current through the channel to facilitate activation of the ninhydrin. As another example, beads of different metals or resin beads coated with different metals are packed at opposite ends of the channel and electrodes connected respectively to each end.

In each of the above embodiments ninhydrin, at relatively low concentrations in a solvent such as methyl Cellosolve and a buffer maintaining a pH of, for example, 5.2, is passed through the reactor. The activated reagent is then directly utilized for identification and quantitation of amino acids. The non-activated reagent is stored without special preservation precautions for long periods with no loss of activity. A reagent generator is also incorporated in a sprayer to continuously activate the reagent as it is sprayed for use in paper chromotography systems.

Though the exact chemistry of ninhydrin activation and reaction with amino acids to produce colored compounds is somewhat obscure, it is believed that the ninhydrin activation reaction is in the nature of an electron transfer and that the metal surfaces provide catalytic surfaces for the reduction of ninhydrin. Furthermore, the metal coated resin beads with two concentric metal layers may act as batteries thereby generating electrons in the same manner as the applied current to activate the ninhydrin reagent. Pure metal beads and resin beads coated with a single metal layer of metals catalytically active in reducing ninhydrin to form activated reagent may also be used in the channel to define the metal surfaced tortuous passageways through which the reagent must pass. Selected metal surfaces appear to act as a catalyst for activating the ninhydrin. The increased sensitivity of colorimetric identification and quantitation using reagent activated according to the present invention may be due to compounds or the activity of compounds other than hydrindantin. Because of the proposed theories of the reaction produced by the reagent generator are uncertain, they are proposed herein merely tentatively to account for the successful operation of the invention, whatever the theory.

Other objects, features and advantages of the present invention will become apparent in the following specification and accompanying drawings.

In the drawings:

FIG. 1 is a side cross-sectional view of a reagent reactor embodying the present invention.

FIG. 2 is a side cross-sectional view of another reagent reactor embodying the present invention.

FIG. 3 is a side view of a reagent sprayer including a reagent reactor similar to that illustrated in FIG. 2.

In the embodiment of the present invention illustrated in FIG. 1 there is provided a reagent reactor 10 formed from an elongated housing 11 having a channel 12 formed therethrough. The ends of the housing 11 are provided with stoppers 13 and 14 formed of a metal to thereby also serve as electrodes. The metal stoppers 13 and 14 are provided with O-ring seals 15 and 16 respectively for sealing engagement with the walls of the elongated housing 11. The metal stopper 14 is provided with a central axial channel 17 and an inlet 18 for receiving stable ninhydrin reagent, while the metal stopper 13 is provided with a central axial channel 20 and an outlet 21 for delivering activated ninhydrin reagent. The stoppers 13 and 14 are made of different metals such as copper and nickel, respectively. The stoppers 13 and 14 are provided with recesses 22 and 23, respectively, in the end of the stoppers inside the reactor. The recesses 22 and 23 are formed to receive and retain tightly packed rolls 24 and 25 of metal screening material. The screening metal is the same metal as the stopper in which it is seated. Thus, if copper and nickel are used for the stoppers 13 and 14, respectively, the screening rolls 24 and 25 will also be formed of copper and nickel, respectively. Each of the tightly packed rolls of metal screening material communicates with the central axial channel in the stopper in which it is seated. The rolls 24 and 25 are out of contact with each other and terminate in the common space 12. The rolls 24 and 25 thus provide a multitude of tortuous passageways defined by metal surfaces through which ninhydrin reagent received in the inlet 18 are delivered through the outlet 21 must percolate.

In utilizing the reactor, ninhydrin reagent in a solvent such as methyl Cellosolve and a buffer maintaining a pH, for example, approximately 5.2, is passed through the reactor. Other solvents which may be used, by way of example, are pyridine and dimethylsulfoxide. A voltage is applied across the electrodes 13 and 14. The ninhydrin reagent percolates through the packed rolls of metal screening 25 and 24 to the outlet 21 from which the activated reagent may be directly utilized for reaction with amino acids to develop the characteristic colored compound for identification and quantitation. It is theorized that some of the stable ninhydrin reagent received in the inlet 18 is reduced to hydrindantin by an electron transfer reaction initiated by the current passing between the metal surfaces of the rolls 24 and 25 of metal screening material, and catalyzed by the metal surfaces.

By way of example, using nickel and copper for the electrodes 13 and 14, respectively, and rolled 100 mesh nickel and copper screen for the rolls 24 and 25, respectively, half strength ninhydrin in a solvent is passed through the generator with 4.3 volts applied across the electrodes. A 6 ma. current passed between the electrodes and the activated ninhydrin reagent from the outlet 21 develops sharp colorimetric or photometric peaks for a sample of amino acids eluted in a chromatographic column. Smaller currents of 2 ma. produced by a voltage of 2.75 volts and current and voltage levels smaller than these by a factor of 10 also produce high resolution colorimetric or photometric peaks upon reaction of the activated ninhydrin with an eluted sample. The nickel may be replaced with an alloy such as Monel with similar results.

An unusual result of the present invention is that an increase in color development with certain amino acids is obtained when using ninhydrin activated according to the invention. A 20% increase in color development for the amino acids glycine, cystine, methionine, and leucine is obtained using ninhydrin reagent activated according to the present invention.

Furthermore, with respect to all amino acids generally, smaller concentrations of ninhydrin activated according to the present invention are as effective as the larger concentrations previously used. Thus, concentrations of ninhydrin as little as one-fifth that heretofore used generate the same color for analysis.

In FIG. 2, there is illustrated another form of reagent reactor in which the application of an external voltage across electrodes is not required. The housing 30 is packed with a plurality of resin beads 31 coated with metal. The resin beads are retained within the housing 30 by porous plugs 32 and 33 communicating with an inlet 34 for receiving ninhydrin reagent and an outlet 35 for delivering ninhydrin, reagent, respectively. The porous plugs 32 and 33 may be replaced by fine mesh screening such as 10 micron stainless steel screening. The housing 30 may be made of glass. The porous plugs 32 and 33 are in turn retained in position by impervious stoppers 36 and 37 including O-rings 38 for sealing engagement between the stoppers 36 and 37 and housing 30. Each of the stoppers 36 and 37 include an axial passageway for the inlet 34 and outlet 35, respectively.

The resin beads may be formed of a cross-linked copolymer resin such as styrene-divinyl benzene copolymer. Other materials for the resin beads are described in my U.S. pat. application, Ser. No. 530,051, now U.S. Pat. No. 3,463,320, entitled "Microsphere Filter and Method of Filtration" filed on Feb. 25, 1966. In order to metallize the resin beads with an intimate chemical bond between the plastic and the metal atoms, an ionic or conductive layer is first formed on the surface of the copolymer as by, for example, sulfonation action. Phosphate ions and various other cations and anions may be used. A first thin layer of copper is then deposited on the surface of the resin beads by electrolytic deposition. A second metal layer of nickel is then formed on the copper layer as by, for example, flashing, to provide a metal to metal bond between the copper and the nickel. The resin beads are thereby provided with a strong and durable metallic surface layer. Other metal besides nickel may be used for the second metal layer. Other examples of metallizing resin beads are set forth in U.S. patent applications Ser. No. 613,136, filed Feb. 1, 1967, and Ser. No. 619,964, filed Mar. 2, 1967, now abandoned, in which I am a co-inventor.

Stable ninhydrin reagent is received in the inlet 34 and passes through the porous plug or screening 32 to percolate through the stack of metallized resin beads 31. The activated reagent then passes through porous plug 33 and outlet 35 for delivery to a reaction chamber for identification and quantitation of amino acids. The reagents so activated develops the characteristic colored compound upon reaction with amino acids providing high resolution colorimetric and photometric analysis of eluted samples from a chromatographic system. Resin beads coated with other metals than nickel over the primary layer of copper, such as gold, silver and iridium, have also been used with success but at a lower efficiency of reagent activation. Similarly, resin beads with a single metal layer and solid pure metal beads of metals such as tin, copper and iron, can be used but also at a lower efficiency. Because there is essentially no loss in weight by the metal during activation of ninhydrin it is believed that the metal surfaces provide some type of catalytic action. Furthermore, the resin beads coated with two metal layers of dissimilar metals provide higher efficiency in ninhydrin activation, suggesting that the metal layers facilitate electron transfer for reduction of ninhydrin in a manner similar to the electronic reagent reactor illustrated in FIG. 1. Thus, the resin beads may be acting as tiny batteries. It is therefore desirable that the outer metal layer of nickel or other metal be of a porous nature. It has been found that increasing the length of the column of beads and therefore the surface area, has an effect analogous to increasing the current in the electronic reagent reactor described above, thereby increasing the effectiveness of the reagent.

For applications in the field of paper chromatography, the reagent reactor may be incorporated within a reagent sprayer as illustrated in FIG. 3. The sprayer 40 comprises a reservoir 41 in which the stable ninhydrin reagent is stored. An outlet tube 42 extends from the head 43 of the sprayer through to the bottom of the reservoir 41. The reagent reactor 44 is inserted in the output line 42 so that reagent from the reservoir 41 passes up through the output line 42 through the reagent reactor 44 to be sprayed from the head of the sprayer. Advantageously the reagent reactor would be of the type illustrated in FIG. 2 so that an external voltage supply would not be necessary. The output line 42 may include a Venturi type atomizer for providing a spray mist. The reagent sprayer may be operated by a pressure source in the head 43 or may be squeeze-operated, or may be operated in the manner of a window-type sprayer. Thus, the reagent reactor 44 may be incorporated in the reagent sprayers of the types heretofore used. The activated reagent may then be directly sprayed onto chromatographic paper on which a sample has been eluted.

It is apparent that a multitude of passageways defined by metal surfaces within the channel through which the reagent passes can be provided in a variety of ways other than the embodiments described herein. For example, particles or beads having shapes other than spherical can be used. In the electronic reagent generator, packed beads or particles of different metals can be packed at each end of the channel instead of the rolled screening. Other modifications and adaptations would be apparent without departing from the true spirit and scope of the following claims.

What is claimed is:

1. A reagent reactor comprising: an elongated housing having a channel therethrough including an inlet at one end for receiving a reagent and an outlet at the other end for discharging activated reagent, said channel defined by surfaces of metallic material catalytically active for activating a reagent passing through the channel, the surfaces of said metallic material formed by a plurality of closely packed beads of a resin material, each said resin bead having at least one concentric metallic layer formed thereon.

2. A reagent reactor as set forth in claim 1 wherein said surfaces of metallic material are formed by a plurality of closely packed particles of said metallic material.

3. A reagent reactor as set forth in claim 1 wherein said metallic layer is formed from nickel.

4. A reagent reactor as set forth in claim 1 wherein each resin bead has an inner copper layer and an outer nickel layer formed concentrically thereon.

5. A ninhydrin reagent reactor comprising an elongated housing having a channel therethrough including an inlet at one end for receiving ninhydrin reagent and an outlet at the other end for discharging activated ninhydrin reagent, said channel packed with a plurality of beads of a resin material, each resin bead having first and second metallic layers formed concentrically thereon.

6. A ninhydrin reagent reactor as set forth in claim 5 wherein said first metallic layer is copper and said second metallic layer is nickel.

7. A ninhydrin reagent reactor as set forth in claim 5 wherein said second metallic layer is porous.

8. A ninhydrin reagent reactor comprising an elongated housing having a channel therethrough including an inlet at one end for receiving ninhydrin reagent and an outlet at the other end for discharging activated ninhydrin reagent, said channel packed with a plurality of spherical beads of a resin material, each resin bead having formed concentrically thereon a layer of a metallic material catalytically active for activating ninhydrin reagent.

9. A ninhydrin reagent reactor comprising: an elongated housing having a channel therethrough including an inlet at one end for receiving ninhydrin reagent, said channel comprising a multitude of tortuous passageways defined by surfaces of metallic material catalytically active for activating ninhydrin reagent percolating through the passageways.

10. A ninhydrin reagent reactor as set forth in claim 9 wherein said surfaces comprise surfaces of metal coated resin.

References Cited

UNITED STATES PATENTS

| | | | |
|---|---|---|---|
| 1,058,113 | 4/1913 | Stuckel | 204—249 X |
| 2,905,323 | 9/1959 | Megesi | 204—249 X |
| 3,180,083 | 4/1965 | Heller | 23—288 X |
| 3,293,165 | 12/1966 | Olney et al. | 204—249 X |
| 3,457,152 | 7/1969 | Maloney, Jr., et al. | 204—275 X |
| 3,471,261 | 10/1969 | Patterson | 23—254 |

JOHN H. MACK, Primary Examiner

D. R. VALENTINE, Assistant Examiner

U.S. Cl. X.R.

204—275; 252—430